Dec. 29, 1942.          A. M. HAMM                2,306,537
                      TRAILER CANOPY
               Filed Oct. 7, 1941          2 Sheets-Sheet 1
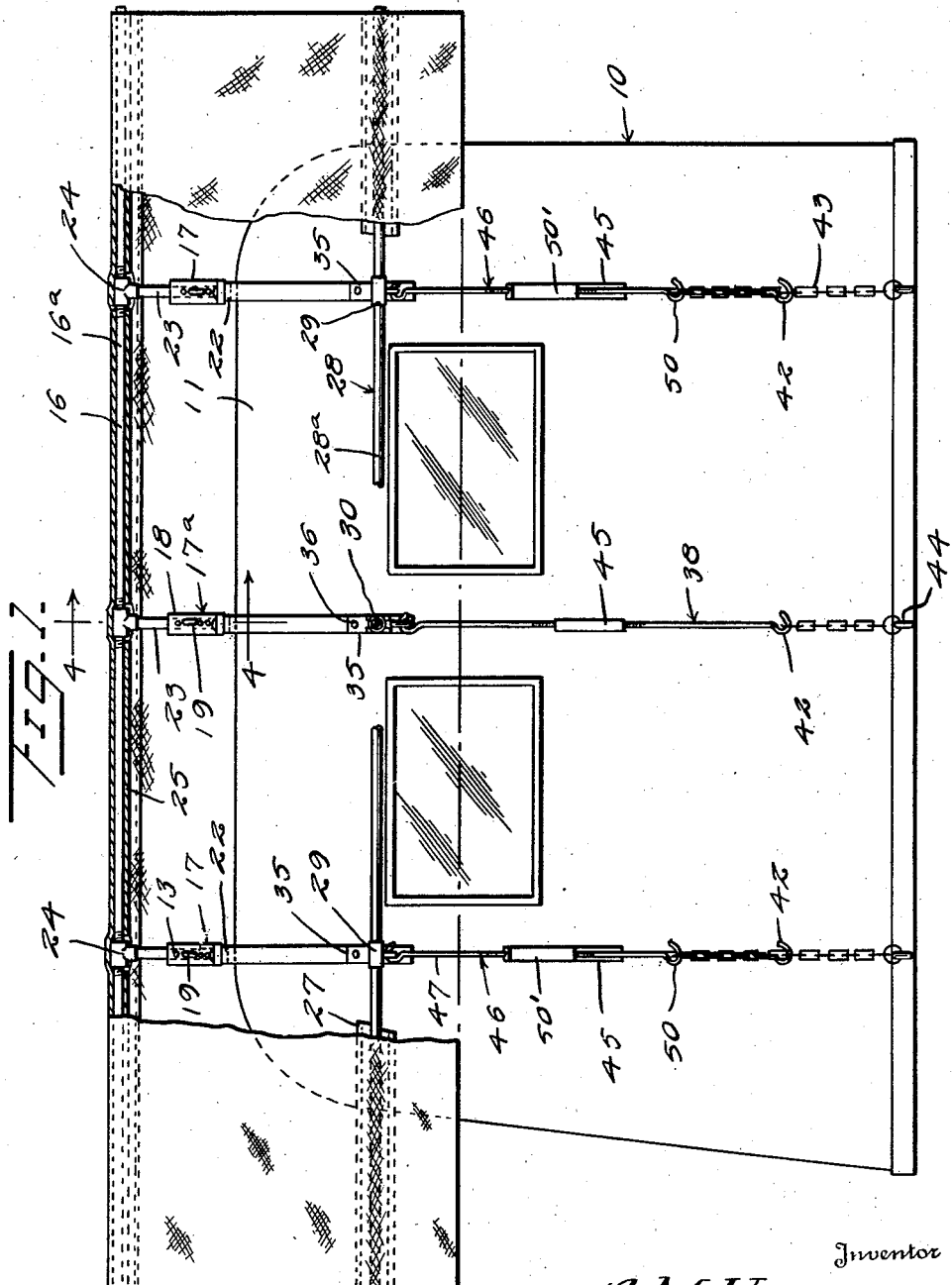
Inventor
A. M. Hamm
By Kimmel & Crowell
Attorneys

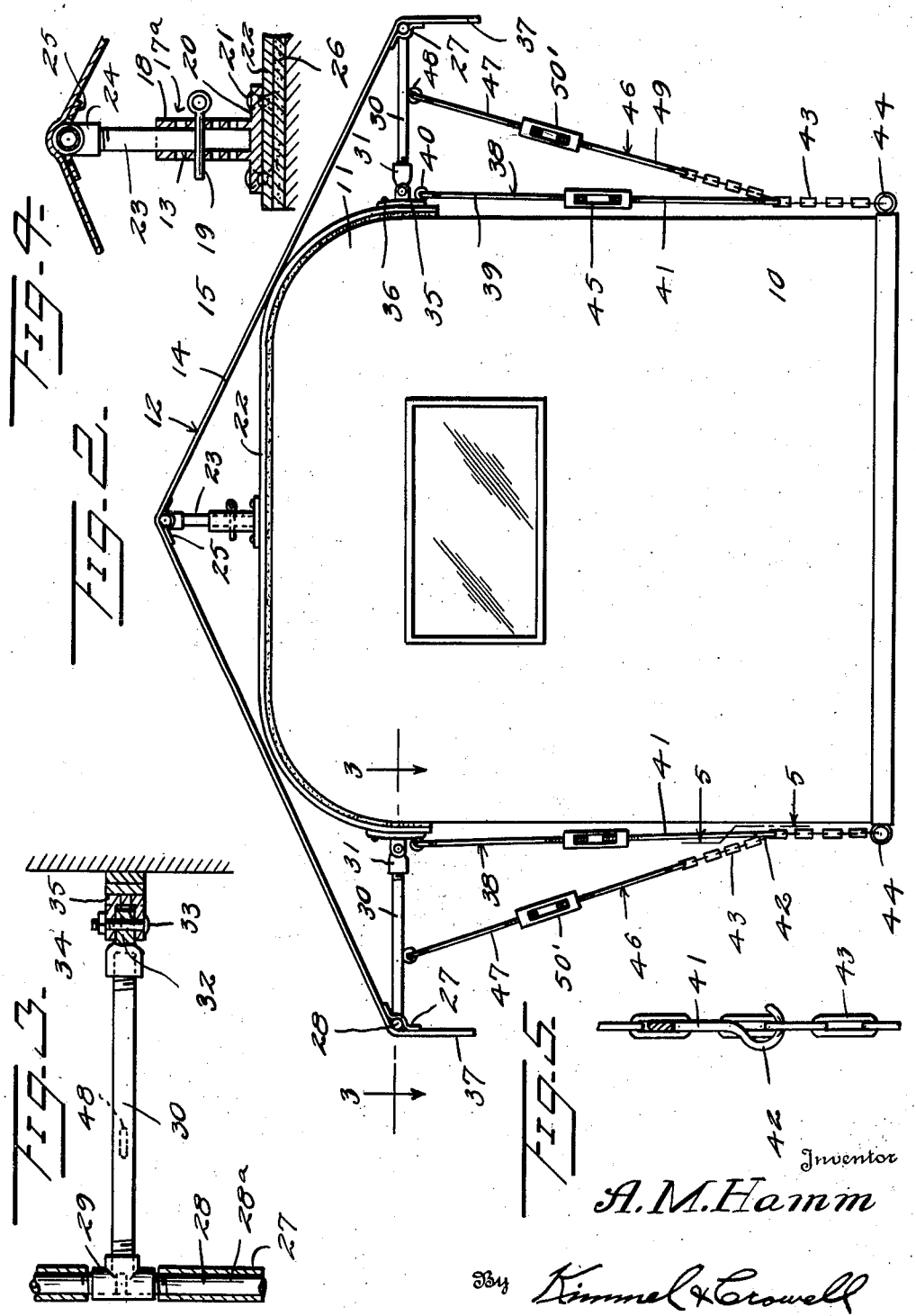

Patented Dec. 29, 1942

2,306,537

UNITED STATES PATENT OFFICE 2,306,537

TRAILER CANOPY

Albert M. Hamm, Mount Vernon, Ill.

Application October 7, 1941, Serial No. 414,026

7 Claims. (Cl. 135—5)

This invention relates to trailer bodies, and more particularly to a canopy or covering for a trailer.

At the present time in the use of trailers it is the practice to park the trailers in a shady spot so that the sun's rays will not unduly heat the roof and interior of the body. However, it not infrequently occurs that no shade is available and as a result the body of the trailer and the interior thereof becomes unduly heated. It is, therefore, an object of this invention to provide a canopy or fabric roof for a trailer which may be easily and quickly mounted on the body, and which will not only provide an air space above the trailer roof but will provide shade on opposite sides and ends of the trailer.

Another object of this invention is to provide a canopy of this kind including an improved supporting structure for the canopy which will not mar or injure the present roof of the trailer and which will readily adjust itself to the particular configuration of the roof.

A further object of this invention is to provide a removable canopy or awning for positioning upon a trailer in spaced relation to the roof of the trailer and which has the side and end portions thereof extended beyond the sides and ends of the trailer to form an awning to thereby provide shade entirely about the trailer and prevent direct sun rays from heating the trailer.

To the foregoing objects and others which may hereinafter appear, the invention consists of the novel construction, combination and arrangement of parts as will be more specifically referred to and illustrated in the accompanying drawings, but it is to be understood that changes, variations and modifications may be resorted to which fall within the scope of the invention as claimed.

In the drawings:

Figure 1 is a detail side elevation partly broken away and in section of a trailer body having a canopy or awning constructed according to an embodiment of this invention mounted thereon.

Figure 2 is a detail end elevation of the trailer and canopy or awning,

Figure 3 is a sectional view taken on the line 3—3 of Figure 2,

Figure 4 is a sectional view taken on the line 4—4 of Figure 1, and

Figure 5 is a sectional view taken on the line 5—5 of Figure 2.

Referring to the drawings the numeral 10 designates generally a trailer body which is formed with a dome shaped roof 11. At the present time in the use of trailers it is the practice wherever possible to position the trailer in a shaded place, so that the sun's rays will not heat up the roof and body and also the interior of the trailer. In many instances, however, it is not possible to position the trailer in a shaded spot so that the rays of the sun unduly heat up the exterior of the trailer and also the interior thereof.

In order to provide a means whereby the trailer 10 may be shaded from the sun's rays, I have provided a canopy structure which is formed of a fabric sheet. The fabric sheet is positioned over the roof 11 of the trailer, and has the opposite side and end portions thereof extended for a substantial distance beyond the sides and ends of the trailer 10 in order to provide a substantial awning structure for shading the sides and ends of the trailer 10. The canopy structure, which is generally designated by the numeral 12, includes a fabric sheet 14 which is of substantially greater length and width than the length and width of the trailer body 10. The sheet 14 when in applied position as shown in Figure 2 will be disposed in a substantially inverted V-shape. The junction or meeting point of the opposite sides 15 of the sheet 14 are formed integral with each other and engage over a longitudinally extending ridge pole 16. The ridge pole 16 may, if desired, be made up of a plurality of axially aligned tubular members or pipes, the combined length of which is substantially equal to the length of the sheet 14.

The ridge pole 16 is adapted to be supported in upwardly spaced relation to the top of the roof 11 by means of a plurality of vertically adjustable standards or pole supporting members generally designated as 17. The standards or pole supporting members 17 include a lower tubular standard member 18 which is formed along the length thereof with a plurality of diametrically opposed openings 13 through selected pairs of which a pin 19 is adapted to engage. The lower end of the lower standard member 18 is secured to a base plate 20 and the base plate 20 is fixed by fastening devices 21 to the upper side of an elongated flexible or resilient strap 22. As shown in Figure 1 there are two end standard members 17 which are of like construction, and also an intermediate standard member 17ª which is similar in every detail to the end standard members 17. An upper adjustable tubular standard member 23 telescopes into the lower standard member 18 and is adapted to rest on the supporting or adjusting pin 19 as shown in Figure 4 so as to support the upper standard member 23 in the desired extended or retracted position. The upper end of the upper standard member 23 has secured thereto a T-shaped coupling member 24, and the ridge pole 16 is adapted to be threaded through the opposed branches of the coupling 24. Where the ridge pole 16 is formed of a plurality of short sections 16ᵃ, these sections are threaded into opposed branches of the coupling members 24. The fabric or canopy sheet 14 has secured to the under side thereof an elongated flexible tunnel forming strip 25 which may be stitched or otherwise secured to the under side of the sheet 14. The strip 25 may be cut out at the points where the coupling members 24 are positioned so that the coupling members 24 as shown in Figure 4 may project downwardly from the tunnel formed by the tunnel forming strip 25.

The elongated strap 22 has secured to the under side thereof a resilient cushioning pad 26 which is adapted to engage the outer surface of the roof 11 so that when the strap 22 is in applied position this strap will not scratch or otherwise mar or injure the surface or finish of the roof 11. The strap 22 being longitudinally bendable may be readily made to conform to the shape or configuration of the roof 11, but when the strap 22 is removed from the roof 11 this strip will assume a substantially straightened position. This may be accomplished by providing the desired temper in the strap 22.

The outer edge portions of the sides 15 of the sheet 14 have secured to the under sides thereof a flexible tunnel forming strip 27. The strip 27 is secured by stitching or other suitable fastening means to the under side of the fabric 14, and an outer tubular member or pole 28 is adapted to engage in the tunnel formed by the strip 27 and the adjacent portion of the fabric 14. The outer pole 28 may be formed as a single element or, if desired, may be formed of axially aligned threaded sections 28ᵃ. A plurality of T-shaped couplings 29 are mounted on the pole or tubular member 28, and inwardly extending bracing or fabric tightening members 30 are threaded into the stem portions of the T couplings 29, and extend horizontally inwardly from the bar or tubular member 28. Where the bar or tubular member 28 is formed in sections the several sections 28ᵃ are threaded into the opposed branches of the couplings 29. The inner end portions of the bracing or tightening members 30 have secured thereto a cylindrical coupling member 31 which is formed with an eye 32 as shown in Figure 3. The eye 32 is pivotally mounted on a pivot bolt 33 which extends through a pair of outstanding ears 34 carried by a base plate 35. The base plate 35 is secured to an end portion, and the outer side of the resilient base strip 22, the base 35 being secured to the strap 22 by fastening devices 36. The fabric 14 as shown in Figures 1 and 2 may be extended at its side portions as shown at 37 so as to provide a valance.

The flexible strap 22 is adapted to be bent to engage and tightly held on the outer surface of the roof 11 by means of a turnbuckle structure generally designated as 38. The turnbuckle structure 38 includes an upper rod 39 which is engaged with an eye 40 carried by the base plate 35. The turnbuckle 38 also includes a lower rod 41 which is formed with a hook 42 which may be engaged with a selected link of a chain 43. The chain 43 extends downwardly along the side of the trailer 10, and is secured at its lower end to an eye 44 which is fixed to the lower portion of the trailer 10. A nut or tightening element 45 is threaded onto the adjacent ends of the two rods 39 and 41 so that the outer end portions of the strap 22 may be held in contacting relation with the outer sides of the trailer 10 adjacent the upper portion thereof.

The canopy 12 is adapted to have the fabric 14 thereof held taut by means of a canopy tightening turnbuckle structure 46. The turnbuckle structure 46 includes an upper elongated rod 47 which has its upper end connected with an eye 48 carried by a horizontal bar 30. A lower turnbuckle rod 49 is formed at its lower end with a hook 50 which is adapted to be engaged with a link of the chain 43 at a point upwardly from the engagement of the hook 42 with the chain 43, so as to form a bend in the chain 43 as shown in Figure 2. A tightening nut 50' is threaded onto the adjacent ends of the two rods 47 and 49 so that when the nut 50' is tightened, the rod 30 will be drawn downwardly, and downward pull on the rod 30 will effect a tightening of the fabric 14 between the two tunnel forming members 25 and 27. The rods 30 may, if desired, be positioned only adjacent the end portions of the trailer body 10 as shown in Figure 1. There may be as many of the straps 22 and standards 17 or 17ᵃ as may be necessary, depending on the length of the trailer 10.

In the use and operation of this canopy structure the canopy fabric 14 is formed with a central longitudinal tunnel by means of the tunnel forming strip 25 and is also formed with outer tunnels by means of the strip 27. The ridge pole 16 is extended into the tunnel formed by the upper portion of the fabric 14 and the tunnel forming strip 25, and the side poles or rails 28 are extended into the tunnels formed by the strips 27.

The standards 17 and 17ᵃ which are fixedly secured to the longitudinally flexible straps 22 may be extended to the desired length so that substantially no portion of the fabric 14 will contact with the roof 11 of the trailer. The adjustment of the standards 17 and 17ᵃ is effected by positioning the adjusting pin 19 in selected pairs of holes 13 in the lower standard member 18. The flexible strap 22 is bent to engage and tightly held on the trailer 10 by adjustment of the turnbuckle structures 38 which are engaged with the chains 43 carried by the eyes 44. After the flexible strap 22 has been firmly positioned on the roof of the trailer, the turnbuckle members 46 may be adjusted to draw the fabric 14 tight in the position shown in Figure 2.

This canopy structure can be easily and quickly applied to any trailer and can also be readily removed from the trailer in the event the trailer is moved from one point to another. The lengths of the horizontal frame members 30 will determine the extension of the canopy beyond the sides of the trailer 10 so as to provide the desired shade or protection laterally of the trailer. The length of the canopy may also be slightly greater than the length of the trailer 10 so as to thereby provide the desired shade or covering beyond the ends of the trailer.

What I claim is:

1. A canopy structure for a trailer comprising a fabric covering, and supporting means for said covering, said supporting means including a plurality of elongated resilient strap members positionable transversely across the roof of the trailer, a ridge pole, means supporting said ridge pole in upwardly spaced relation to said strap member, a pair of side poles, means pivotally supporting said side poles in spaced relation to the ends of said strap members, and means connected with said strap members and with said trailer for bending said strap members to conform to the configuration of the trailer roof while simultaneously holding said covering taut.

2. A canopy structure for trailer comprising a fabric covering, and supporting means for said covering, said supporting means including a plurality of elongated resilient strap members positionable transversely across the roof of the trailer, a ridge pole, means supporting said ridge pole in upwardly spaced relation to said strap members, said supporting means including lengthwise adjustable standards carried partly by said strap members and partly by said ridge pole, a pair of side poles, means pivotally supporting said side poles in spaced relation to the ends of said strap members, and means connected with said strap members and with said trailer for bending said strap members to conform to the configuration of the trailer roof while simultaneously holding said covering taut.

3. A canopy structure for a trailer comprising a fabric covering, and supporting means for said covering, said supporting means including a plurality of elongated resilient strap members positionable transversely across the roof of the trailer, a ridge pole, means supporting said ridge pole in upwardly spaced relation to said strap members, said supporting means including a lower tubular standard, means securing said lower standard to a strap member, an upper tubular standard telescoping into said lower standard, means securing said upper standard to said ridge pole, means adjusting the position of said upper standard relative to said lower standard, a pair of side poles, means pivotally supporting said side poles in spaced relation to the ends of said strap members, and means connected with said strap members and with said trailer for bending said strap members to conform to the configuration of the trailer roof while simultaneously holding said covering taut.

4. A canopy supporting frame structure for detachable mounting on a trailer comprising a plurality of normally straight resilient elongated strap members, means for tightly holding said members in longitudinally bent form on the roof of the trailer with the ends of said members disposed in depending position along the sides of the trailer, a ridge pole extending longitudinally of the trailer, means supporting said pole in upwardly spaced relation with respect to said members, a pair of side poles disposed in parallel relation with respect to said ridge pole, and means securing said side poles to the opposite ends of said strap members and in laterally spaced relation with respect to the latter.

5. A canopy supporting frame structure for detachable mounting on a trailer comprising a plurality of normally straight resilient elongated strap members, means for tightly holding said members in longitudinally bent form on the roof of the trailer with the ends of said members disposed in depending position along the sides of the trailer, a ridge pole extending longitudinally of the trailer, means supporting said pole in upwardly spaced relation with respect to said members, a pair of side poles disposed in parallel relation with respect to said ridge pole, means securing said side poles to the opposite ends of said strap members and in laterally spaced relation with respect to the latter, and a cushioning element fixed to the lower face of each strap member.

6. A canopy and supporting means for supporting the canopy upon a trailer, said canopy comprising a fabric covering, means forming a central longitudinal tunnel in said fabric, means forming a pair of side tunnels in said fabric, a ridge pole engaging in said central tunnel, a pair of side poles engaging in said side tunnels, a plurality of normally straight resilient elongated strap members, an upright hollow standard carried by each strap member, a depending standard member carried by said ridge pole telescoping into said first standard, means supporting said depending standard in adjusted position relative to said upright standard, bracing members fixed to said side poles and extending right angularly therefrom, means pivotally securing said bracing members to the opposite ends of said strap members, means holding said strap members in top conforming position, and means connected with said bracing members outwardly of the inner ends thereof and with the trailer for drawing said bracing members downwardly to thereby hold said covering taut.

7. A canopy and supporting means for supporting the canopy upon a trailer, said canopy comprising a fabric covering, means forming a central longitudinal tunnel in said fabric, means forming a pair of side tunnels in said fabric, a ridge pole engaging in said central tunnel, a pair of side poles engaging in said side tunnels, a plurality of normally straight resilient elongated strap members, an upright hollow standard carried by each strap member, a depending standard member carried by said ridge pole telescoping into said first standard, means supporting said depending standard in adjusted position relative to said upright standard, bracing members fixed to said side poles and extending right angularly therefrom, means pivotally securing said bracing members to the opposite ends of said strap members, means holding said strap members in top conforming position, a resilient pad fixed to the under side of each strap member, and means connected with said bracing members outwardly of the inner ends thereof and with the trailer for drawing said bracing members downwardly to thereby hold said covering taut.

ALBERT M. HAMM.